(12) United States Patent
Suzuki et al.

(10) Patent No.: US 8,439,400 B2
(45) Date of Patent: May 14, 2013

(54) IMPACT ABSORBER

(75) Inventors: Toshihiro Suzuki, Gamagori (JP); Yasuomi Tanaoka, Chiryu (JP); Teruo Tamada, Yamato (JP)

(73) Assignees: Toyota Boshoku Kabushiki Kaisha, Aichi-Ken (JP); Kyoraku Co., Ltd., Kyoto-Shi (JP)

( * ) Notice: Subject to any disclaimer, the term of this patent is extended or adjusted under 35 U.S.C. 154(b) by 0 days.

(21) Appl. No.: 13/234,851

(22) Filed: Sep. 16, 2011

(65) Prior Publication Data

US 2012/0080872 A1 Apr. 5, 2012

(30) Foreign Application Priority Data

Sep. 30, 2010 (JP) ................................. 2010-222838

(51) Int. Cl.
*B60R 21/04* (2006.01)
(52) U.S. Cl.
USPC ........................................................ 280/751
(58) Field of Classification Search ............... 280/730.2, 280/751
See application file for complete search history.

(56) References Cited

U.S. PATENT DOCUMENTS

| | | | | |
|---|---|---|---|---|
| 4,272,103 A * | 6/1981 | Schmid et al. ................. | 280/751 |
| 5,356,177 A * | 10/1994 | Weller ........................... | 280/751 |
| 5,395,135 A * | 3/1995 | Lim et al. ....................... | 280/751 |
| 5,482,344 A * | 1/1996 | Walker et al. ................. | 296/39.1 |
| 5,749,600 A * | 5/1998 | Yamada et al. ................ | 280/751 |
| 6,543,838 B1 * | 4/2003 | Bertolini et al. ............ | 296/146.1 |
| 6,955,391 B1 * | 10/2005 | Peng ............................ | 296/146.6 |
| 6,976,706 B2 * | 12/2005 | Smith et al. .................... | 280/753 |
| 7,357,444 B2 * | 4/2008 | Cowelchuk et al. ..... | 296/187.05 |
| 7,618,082 B2 | 11/2009 | Tamada | |
| 7,708,307 B2 * | 5/2010 | Ida et al. ..................... | 280/730.2 |
| 7,997,637 B2 | 8/2011 | Suzuki et al. | |
| 2004/0232666 A1 * | 11/2004 | Sato et al. ................... | 280/730.2 |
| 2005/0104342 A1 * | 5/2005 | Jackson et al. ............. | 280/730.2 |
| 2007/0102905 A1 * | 5/2007 | Ryan et al. .................. | 280/730.2 |
| 2007/0246925 A1 * | 10/2007 | Mani .............................. | 280/751 |
| 2008/0203749 A1 | 8/2008 | Tamada | |
| 2010/0259069 A1 | 10/2010 | Suzuki et al. | |

FOREIGN PATENT DOCUMENTS

| JP | 3313999 | 5/2002 |
|---|---|---|
| JP | 2004-299632 | 10/2004 |

* cited by examiner

*Primary Examiner* — Faye M. Fleming
(74) *Attorney, Agent, or Firm* — Greenblum & Bernstein, P.L.C.

(57) ABSTRACT

An impact absorber is provided in a trim of a vehicle for protecting a waist portion of a passenger. The impact absorber includes: a first portion corresponding to the pubis of the passenger; and a second portion corresponding to the ilium of the passenger. Stress generated in the first portion when the passenger hits the trim has a first predetermined value or less, and stress generated in the second portion when the passenger hits on the trim has a second predetermined value or more, the second predetermined value being greater than the first predetermined value.

15 Claims, 7 Drawing Sheets

FIG. 7

IMPACT ABSORBER

CROSS-REFERENCE TO RELATED APPLICATION

This application is based on Japanese Patent Application No. 2010-222838 filed with the Japan Patent Office on Sep. 30, 2010, the entire content of which is hereby incorporated by reference.

BACKGROUND

1. Technical Field

The present disclosure relates to an impact absorber for absorbing collision impact.

2. Description of the Related Art

In recent years, strengthening of a car body and mounting of an air bag have been implemented to enhance collision safety performance of a car. In addition, reduction in fuel consumption has given much consideration for resource saving, environmental issues, for example. Thus, the inventors have found that reduction in weight of a car has been strongly demanded. Therefore, materials of various components in a car have been expeditiously converted from metal materials to resin materials, while reduction in amount of a resin material used in a component has been also rapidly progressed.

In recent years, moreover, enhancement in safety performance in a lateral collision has been also explored in addition to improvement in safety performance in a head-on collision. The door enhances the safety performance in the lateral collision. For this reason, an impact absorber for relieving an impact on a car in a lateral collision is placed between a door panel and a door trim.

Exemplary impact absorbers include, for example, one having a hollow wall structure formed by blow-molding a thermoplastic resin. For example, an impact absorber disclosed in Japanese Patent No. 3313999 has a body in the form of an almost hollow cube. The body is provided with an abutting surface and a support surface that are opposed to each other. The abutting surface has a recessed rib formed by denting a part thereof toward the support surface. Moreover, the support surface has also a recessed rib formed by denting a part thereof toward the abutting surface. Moreover, there is disclosed an impact absorber constituted to have a bonding portion on which tips of two recessed ribs abut.

In the lateral collision, a passenger hits the door trim. At this time, an impact to the passenger is relieved by the impact absorber provided in the door trim. Consequently, the passenger is protected.

In some cases in which an impact speed is high, however, a waist portion of the passenger hits the door trim. In these cases, a great load is applied to the waist portion of the passenger through the door trim. The great load affects the passenger in some cases. For this reason, attempts are made to reduce the load to be applied to the passenger in a collision.

There is a document (for example, JP-A-2004-299632), which discloses a structure of a door trim for a vehicle to achieve a high impact-absorbing property. The structure of a door trim for a vehicle described in JP-A-2004-299632 includes a portion that corresponds to a soft abdominal portion of a passenger and has a low impact-absorbing property. On the other hand, the impact absorber has a high compressive strength in a portion corresponding to a comparatively hard waist portion.

In the structure of a door trim for a vehicle which is disclosed in JP-A-2004-299632, a plurality of recessed ribs 8 is formed to absorb an impact. An interval between an external wall surface 5 and the tip portion of the recessed rib 8 is 20 to 40 mm in a portion "a" corresponding to the abdominal part of the passenger. On the other hand, both the external wall surface 5 and the tip portion of the recessed rib 8 are close to each other, abut on each other or are welded to each other in such a manner that the interval between them is smaller than 20 mm in a portion "b" corresponding to a waist portion of the passenger.

SUMMARY

An impact absorber is provided in a trim of a vehicle for protecting a waist portion of a passenger. The impact absorber includes: a first portion corresponding to the pubis of the passenger; and a second portion corresponding to the ilium of the passenger. Stress generated in the first portion when the passenger hits the trim has a first predetermined value or less, and stress generated in the second portion when the passenger hits on the trim has a second predetermined value or more, the second predetermined value being greater than the first predetermined value.

DESCRIPTION OF EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

The structure disclosed in JP-A-2004-299632 includes a plurality of portions having an impact-absorbing performance depending on a corresponding portion of a human body. However, the structure described in JP-A-2004-299632 indicates a structure of a door trim itself and is not a structure of an impact absorber to be provided in the door trim. With the structure disclosed in the document, moreover, a portion corresponding to a waist portion has a high impact-absorbing property. However, the document does not describe reduction in a load to be applied to the pubis in the waist portion.

It is an object of the present disclosure to provide an impact absorber which can reduce a load to be applied to the pubis of a passenger and to exhibit sufficient impact-absorbing performance when a car receives an impact.

<Impact Absorber>

An impact absorber is provided in a trim of a vehicle for protecting a waist portion of a passenger. The impact absorber includes: a first portion corresponding to the pubis of the passenger; and a second portion corresponding to the ilium of the passenger. Stress generated in the first portion when the passenger hits the trim has a first predetermined value or less, and stress generated in the second portion when the passenger hits on the trim has a second predetermined value or more, the second predetermined value being greater than the first predetermined value.

According to the mode, it is possible to reduce a load to be applied to the pubis of a passenger and to exhibit sufficient impact-absorbing performance when a passenger hits the trim.

<Schematic Configuration of Impact Absorber 100>

First of all, the schematic configuration of an impact absorber 100 according to an embodiment will be described with reference to FIGS. 5A, 5B and 6A.

When a vehicle collides with a side surface of another vehicle, that is, a door panel (an outer door panel 203) in a lateral collision), the whole vehicle including a door trim 201 is moved in a colliding direction. At this time, a passenger P remains in an original position by inertia. For this reason, a waist portion L of the passenger P hits the door trim 201. In the lateral collision, moreover, the door trim 201 bulges to gradually approach the passenger P in some cases. Also in these cases, the waist portion L of the passenger P hits the door trim 201.

The impact absorber 100 according to the embodiment is provided in the door trim 201 for a vehicle. The impact absorber 100 protects the waist portion L of the passenger P that hits the door trim 201 in the lateral collision. The impact absorber 100 has first portions 41 and 51 and second portions 42 and 52. The first portions 41 and 51 correspond to the pubis 112 of the passenger P. When the passenger P hits the door trim 201 through the first portions 41 and 51, stresses generated in the first portions 41 and 51 are equal to or smaller than a first predetermined value (for example, 2.5 kN per 100 cm$^2$). On the other hand, the second portions 42 and 52 correspond to the ilium 113 of the passenger P. Referring to the second portions 42 and 52, when the passenger P hits the door trim 201, stresses generated in the second portions 42 and 52 are equal to or greater than a second predetermined value (for example, 7.0 kN per 100 cm$^2$). When the passenger P hits the door trim 201, consequently, the first portions 41 and 51 reduce a load to be applied to the pubis 112 of the passenger P. Furthermore, the first portions 42 and 52 exhibit sufficient impact-absorbing performance. Hereinafter, the impact absorber 100 will be described in detail with reference to the attached drawings.

<Example of Structure of Impact Absorber 100>

Figure 1:
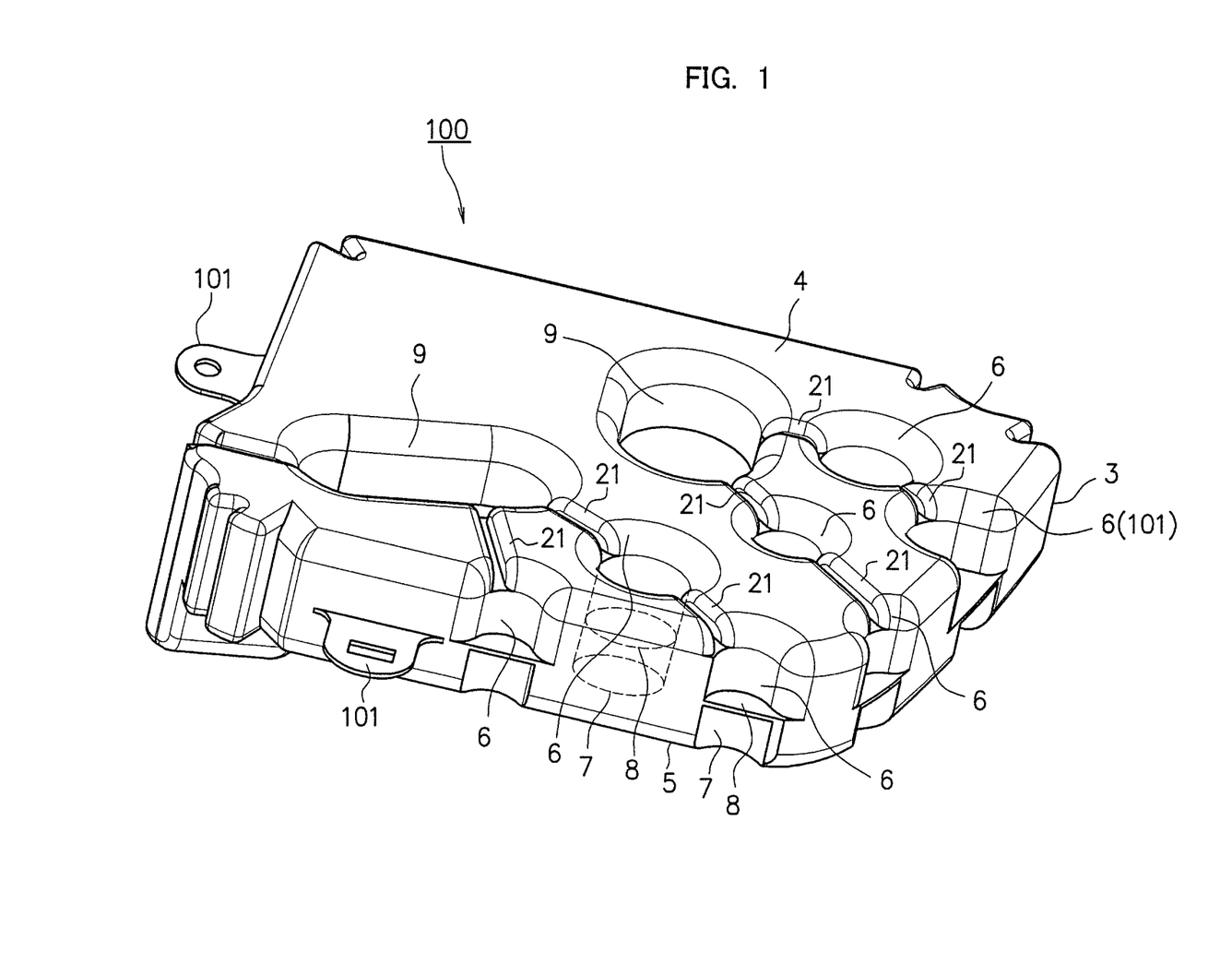
FIG. 1 is a view illustrating an example of a whole structure of an impact absorber according to an embodiment.
Figure 2:
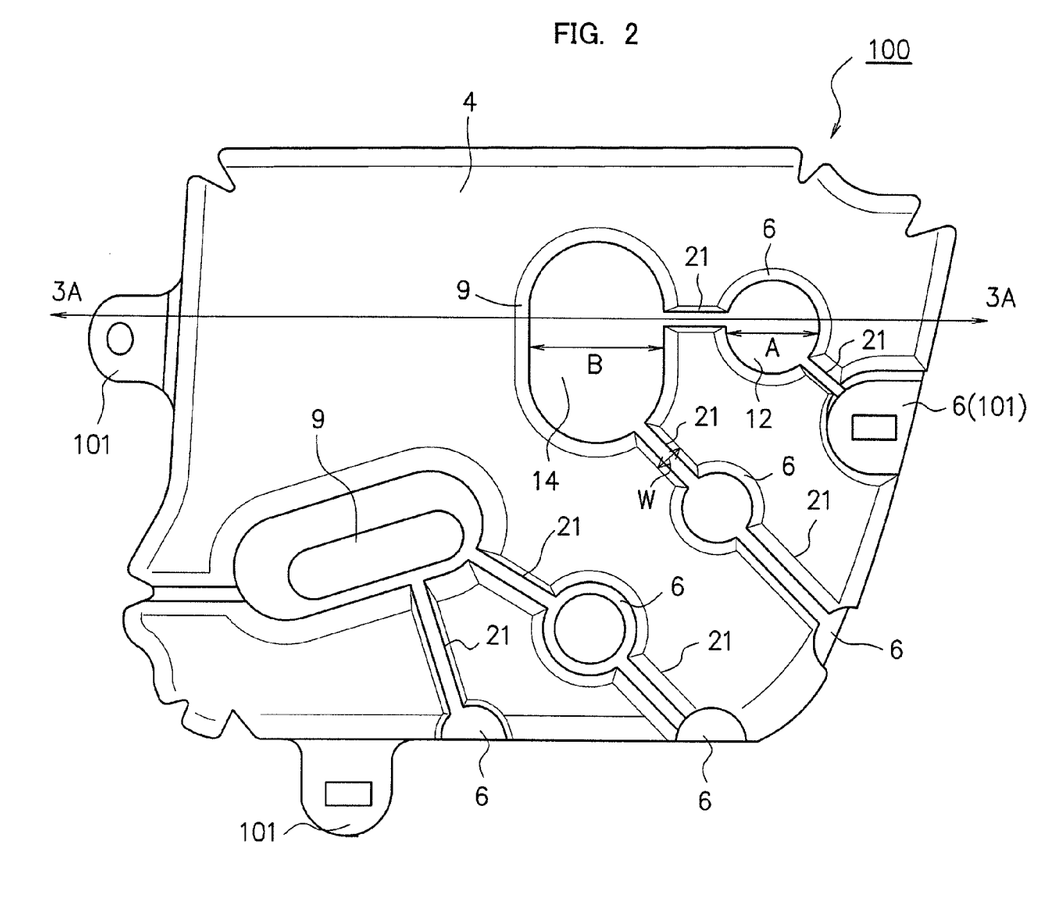
FIG. 2 is a view illustrating an example of a surface structure of the impact absorber according to the embodiment.
Figure 3:
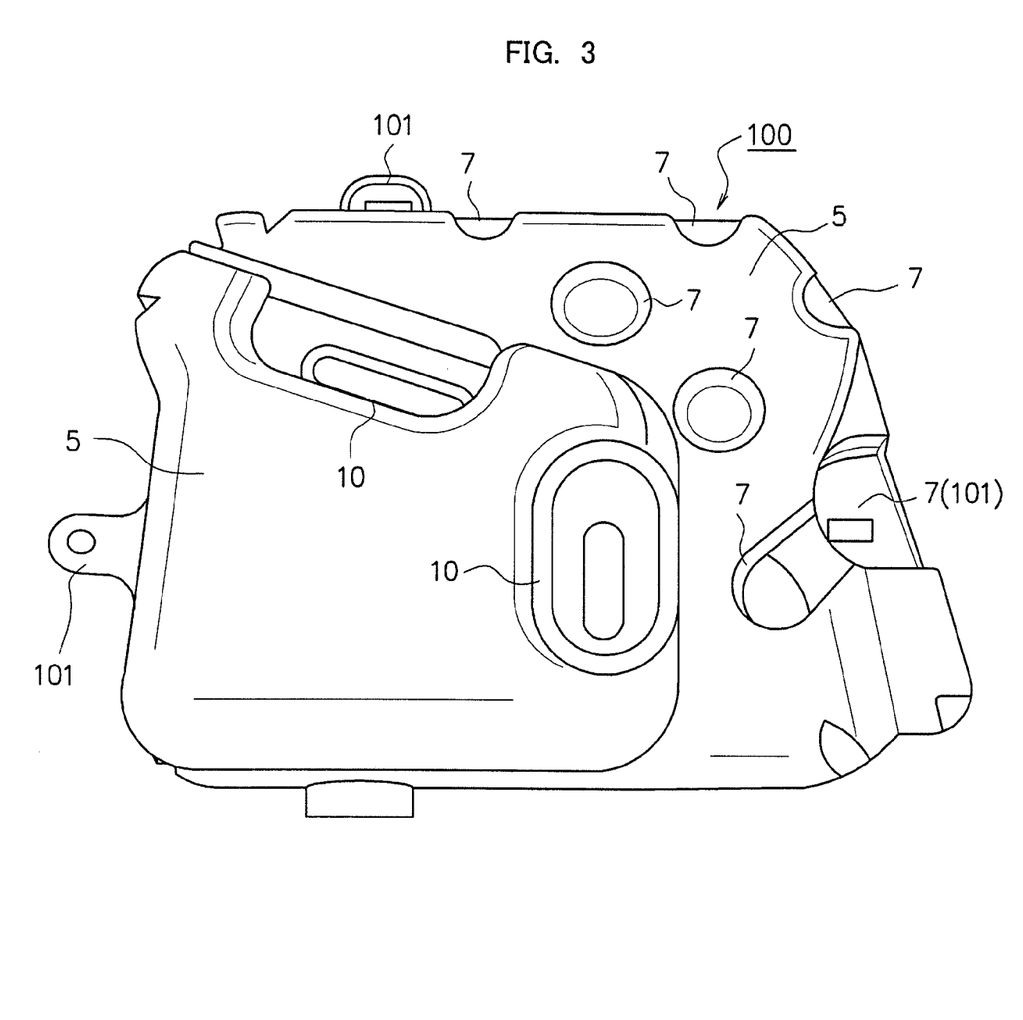
FIG. 3 is a view illustrating an example of a back structure of the impact absorber according to the embodiment.
Figure 4:
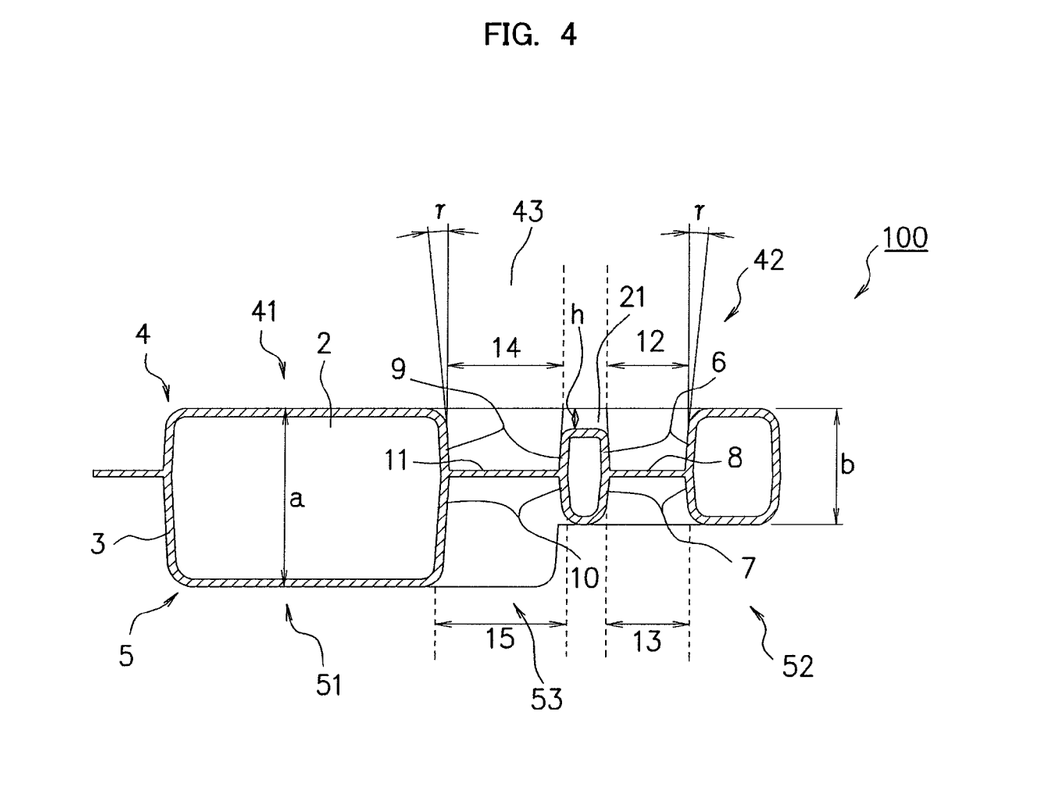
FIG. 4 is a view illustrating an example of a partial sectional structure of the impact absorber according to the embodiment.

First, an example of a structure of the impact absorber 100 according to the embodiment will be described with reference to FIGS. 1 to 4. The impact absorber 100 effectively protects a waist portion of a passenger. The impact absorber 100 is provided between a door panel and a door trim. A position in which the impact absorber 100 is to be provided corresponds to a portion of the door trim with which the waist portion of the passenger abuts in a lateral collision. FIG. 1 is a perspective view of the impact absorber 100. FIG. 2 is an illustration of a surface structure on a first wall 4 side of the impact absorber 100. FIG. 3 is an illustration of a surface structure on a second wall 5 side of the impact absorber 100. FIG. 4 is a cross-sectional view taken along 3A-3A line illustrated in FIG. 2, of a sectional structure of the impact absorber 100.

The impact absorber 100 has a body 3. The body 3 has the first wall 4 and the second wall 5 that are provided opposite each other. The first wall 4 is a surface positioned on a passenger side (a door trim side) of the impact absorber 100. The second wall 5 is a surface positioned on an opposite side to the passenger in the impact absorber 100.

The impact absorber 100 (the body 3) is formed hollowly by blow-molding a thermoplastic resin. Accordingly, the body 3 of the impact absorber 100 has a hollow portion 2 (see FIG. 4). The first wall 4 of the body 3 is provided with a plurality of first recessed ribs 6 and a plurality of second recessed ribs 9. The second wall 5 is provided with a plurality of first recessed ribs 7 and a plurality of second recessed ribs 10.

The first recessed rib 6 and the second recessed rib 9 are formed by denting part of the first wall 4 inwardly toward the second wall 5. The first recessed rib 7 and the second recessed rib 10 are formed by denting part of the second wall 5 inwardly toward the first wall 4.

The first recessed rib 6 and the first recessed rib 7 are provided opposite each other. A tip portion of the first recessed rib 6 and a tip portion of the first recessed rib 7 abut on each other. The abutting portion constitutes a bonding portion 8.

The first recessed ribs 6 and 7 may be of various shapes. Moreover, a diameter of the first recessed rib 6 is reduced from an open end 12 of the first wall 4 toward the hollow portion 2 as illustrated in FIG. 4. Moreover, a diameter of the first recessed rib 7 is reduced from an open end 13 of the second wall 5 toward the hollow portion 2. The first recessed ribs 6 and 7 are gradually decreased at angles (diameter reducing angles) γ of 3 to 30 degrees. The diameters A of the open ends 12 and 13 are in a range of 10 to 40 mm (see, diameter A in FIG. 2). When the first recessed ribs 6 and 7 are formed to satisfy this range of numeric values, the first recessed ribs 6 and 7 are compressed and deformed by a load received when being hit by the passenger P, such that the whole impact absorber 100 is deformed. When the impact absorber 100 is deformed, an energy caused by the impact on the passenger P is consumed. For this reason, stress (repulsive force) generated from the impact absorber 100 toward the passenger P is properly regulated. In other words, by forming the first recessed ribs 6 and 7 to satisfy the above range of numeric values, it is possible to maximize a cushioning effect of the body 3 of the impact absorber 100. This has been confirmed by an experiment.

Furthermore, the tip portion of the second recessed rib 9 and the tip portion of the second recessed rib 10 which make a pair abut on each other. The abutting portion serves as a bonding portion 11.

The second recessed ribs 9 and 10 have larger shapes than the first recessed ribs 6 and 7, respectively. Moreover, the diameters of the second recessed ribs 9 and 10 are also reduced from the open end 14 of the first wall 4 or the open end 15 of the second wall 5 toward the hollow portion 2 as illustrated in FIG. 4. The diameter reducing angle γ is 3 to 30 degrees. The open ends 14 and 15 have a diameter B (see FIG. 2) of 10 to 80 mm. The open ends 14 and 15 constitute a larger open region than an open region of the open ends 12 and 13 of the first recessed ribs 6 and 7.

As illustrated in FIG. 2, moreover, a coupling rib 21 is provided on the first wall 4 side. The coupling rib 21 couples the first recessed ribs 6 to each other, and the first recessed rib 6 and the second recessed rib 9. The coupling rib 21 has a depth h of 3.0 to 15.0 mm. The coupling rib 21 has a width W of 2.0 mm to 5.0 mm. By coupling the first recessed ribs 6 to each other and coupling the first recessed rib 6 to the second recessed rib 9, it is possible to hold a posture of the first recessed rib 6 or the second recessed rib 9 to be constant. Therefore, it is possible to achieve the proper compressive deformation of the recessed rib.

The body 3 of the impact absorber 100 has first portions 41 and 51, second portions 42 and 52, and third portions 43 and 53 as illustrated in FIG. 4. The total thickness "a" of the first portions 41 and 51 is comparatively large (i.e., the thickness of the body 3). The total thickness "b" of the second portions 42 and 52 is comparatively small. The third portions 43 and 53 are provided between the first portions 41 and 51 and the second portions 42 and 52, respectively. The first recessed ribs 6 and 7 are not formed in the first portions 41 and 51, respectively. On the other hand, the first recessed ribs 6 and 7 are formed in the second portions 42 and 52, respectively. The second recessed ribs 9 and 10 are formed in the third portions 43 and 53, respectively. The total thickness "a" is 50 mm to 150 mm. The total thickness "b" is 20 mm to 100 mm (the total thickness "a">the total thickness "b" is set constantly).

In the impact absorber 100, neither the first recessed ribs 6 and 7 nor the second recessed ribs 9 and 10 are formed in the first portions 41 and 51. The first recessed ribs 6 and 7 are formed in the second portions 42 and 52. The second recessed ribs 9 and 10 are formed in the third portions 43 and 53. For this reason, the impact absorber 100 includes a plurality of portions 41, 51, 42, 52, 43 and 53 having rib densities that are different from each other. The rib density indicates an arrangement density of the recessed ribs 6, 7, 9 and 10. In the impact absorber 100, the first portions 41 and 51 have low rib densities. The second portions 42 and 52 have high rib densities. The third portions 43 and 53 have rib densities that are generally medium (a rib density ranging from the rib densities of the first portions 41 and 51 to the rib densities of the second portions 42 and 52).

The portions 41, 51, 42, 52, 43 and 53 with different rib densities have their respective compressive strengths, rigidities and distortion quantities as structure components. In the impact absorber 100, therefore, the first portions 41 and 51, the second portions 42 and 52, and the third portions 43 and 53 can exhibit their own impact-absorbing performance.

A method of changing the rib density may be a method of changing an average pitch interval between the recessed ribs 6, 7, 9 and 10 or a method of changing sizes of the recessed ribs 6, 7, 9 and 10 (diameters in cross sections).

For example, by reducing the average pitch interval between the first recessed ribs 6 and 7 or reducing the sizes of the first recessed ribs 6 and 7, it is possible to increase a total area of the first recessed ribs 6 and 7 in the second portions 42 and 52 (it is possible to increase the arrangement density of the first recessed ribs 6 and 7). Consequently, it is possible to increase the rigidities of the second portions 42 and 52. To the contrary, by increasing the average pitch interval between the first recessed ribs 6 and 7 or increasing the sizes of the first recessed ribs 6 and 7, it is possible to reduce the total area of the first recessed ribs 6 and 7 in the second portions 42 and 52 (it is possible to reduce the arrangement density of the first recessed ribs 6 and 7). Consequently, it is possible to reduce the rigidities of the second portions 42 and 52. The rib densities of the second portions 42 and 52 can be represented as a value obtained through a division of a total surface area of the open ends 12 and 13 by the surface areas of the first wall 4 and the second wall 5 corresponding to the second portions 42 and 52. The rib densities of the first portions 41 and 51 and the third portions 43 and 53 can also be obtained by the same calculation as that for the second portions 42 and 52.

In the impact absorber 100, moreover, the first portions 41 and 51 and the third portions 43 and 53, that have the larger total thickness "a", have smaller wall thicknesses (i.e., the thickness of a first wall 4 and the thickness of a second wall 5). The second portions 42 and 52, which have the smaller total thickness "b", have greater wall thicknesses. The portions 41, 51, 42, 52, 43 and 53 having all thicknesses different from each other have rigidities and distortion quantities that are different from each other. In the impact absorber 100, therefore, it is possible to vary the rib densities of the portions 41, 51, 42, 52, 43 and 53, and furthermore, to control the wall thicknesses of the portions 41, 51, 42, 52, 43 and 53. Consequently, the portions 41, 51, 42, 52, 43 and 53 can be configured to be greatly different in impact-absorbing performance from each other.

In the embodiment, it is assumed that the respective rib densities and wall thicknesses of the portions are configured to be different from each other in order to regulate the stress generated in the impact absorber 100 in the lateral collision. By only configuring the respective wall thicknesses of the portions to be different from each other in a state in which the respective rib densities of the portions are set to be equal to each other, however, it is possible to regulate the stress generated in the impact absorber 100. By configuring the respective rib densities of the portions to be different from each other in a state in which the respective wall thicknesses of the portions are set to be approximately equal to each other, it is possible to regulate the stress generated in the impact absorber 100 similarly.

For a thermoplastic resin constituting the body 3 of the impact absorber 100, it is possible to apply a well-known resin. For example, it is possible to apply a resin having a mechanical hardness (e.g., a rigidity). Examples of the resin include: polyolefin based resins, such as polyethylene and polypropylene; styrene based resins, such as polystyrene and an ABS resin; polyester based resins, such as polyethylene terephthalate; polyamide; and mixtures thereof.

Moreover, the thermoplastic resin constituting the body 3 may also contain one or more additives used in the art as long as the mechanical strength (impact resistance) of the thermoplastic resin is not damaged. Examples of the additive include fillers (e.g., silica), pigments, dyes, heat stabilizers, light stabilizers, plasticizers, antistatic agents, fire retarding agents, flameproofing agents, antiaging agents, ultraviolet absorbing agents, antioxidating agents, anti-fogging agents, and lubricating agents.

A test for confirming safety performance in a lateral collision is a lateral collision test. In this test, a dummy doll is put on a vehicle to be evaluated. A damage value received by the dummy doll in the lateral collision (a maximum value of a load (a compressive load) to be applied to a waist portion) is detected. Based on the result of the detection, the safety performance in the lateral collision is confirmed. A sensor for measuring the damage value of the waist portion is mounted on a pubis part.

Figure 5A:
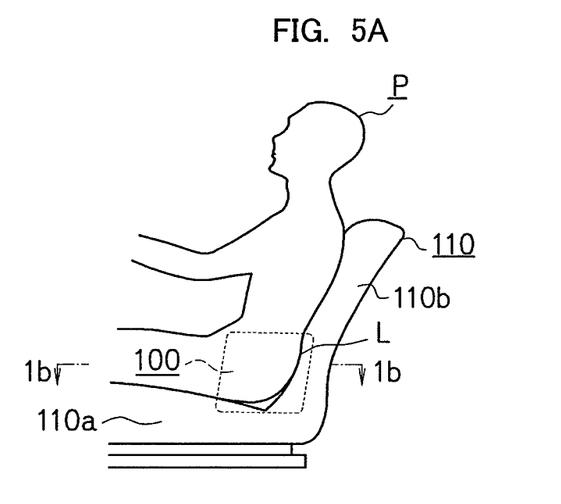
FIGS. 5A and 5B are views illustrating an example of an arrangement of the impact absorber according to the embodiment.
Figure 5B:
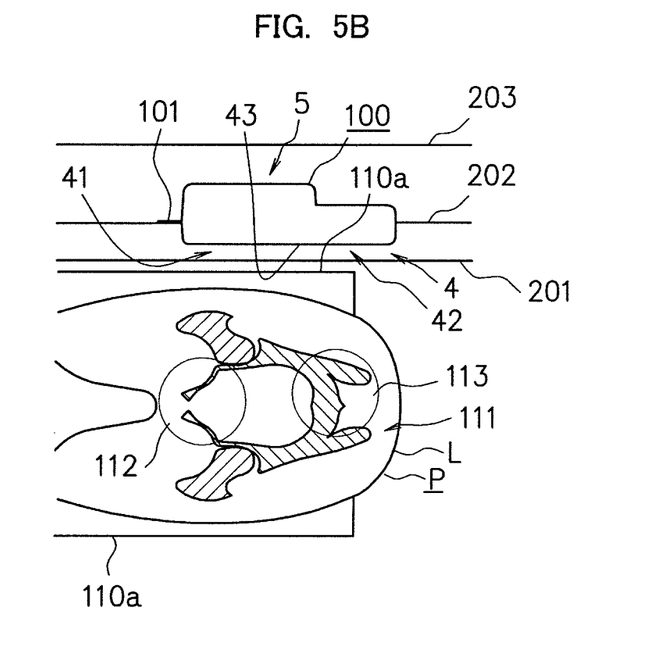

FIGS. 5A and 5B typically show a waist portion L of the passenger P in a state in which the passenger P to be the dummy doll sits on a seat portion 110a of a vehicle seat 110. FIG. 5A is a side view. FIG. 5B is a cross-sectional view taken along 1b-1b line illustrated in FIG. 5A.

As illustrated in FIG. 5B, the door trim 201 for dividing a side portion of a compartment is disposed on a side of the seat portion 110a. The door trim 201 is disposed to be extended in a longitudinal direction of the vehicle in the same manner as the seat 110 and the passenger P.

In some cases, the waist portion L of the passenger P hits the door trim 201 in a just transverse direction in the lateral collision. In these cases, a load to be applied to the waist portion L of the passenger P from the door trim 201 indicates a distribution having a characteristic deviation corresponding to a skeleton of the waist portion L. In particular, an initial load to be applied to the waist portion L tends to directly concentrate on a forward (the pubis 112) side of the pelvis 111. When the load concentrates on the fragile pubis 112, the pubis 112 will be affected.

For example, also in the case in which almost equal loads to each other are applied to a front part (the pubis 112 side) and a rear part (the ilium 113 side) in the pelvis 111, stress in the front part (the pubis 112 side) of the pelvis 111 is higher than stress in the rear part (the ilium 113 side) thereof.

In order to cause the load to be applied to the pubis 112 side of the pelvis 111 to be smaller than the load to be applied to the ilium 113 side of the pelvis 111, stress generated in a portion corresponding to the pubis 112 of the pelvis 111 may be lower than stress generated in a portion corresponding to the ilium 113 in the impact absorber 100. In order to protect the waist portion L in the lateral collision, moreover, transmission of a great shock (load) to the waist portion L in a moment at an initial stage in the lateral collision has only to be avoided. In addition, impact may sufficiently be absorbed through initial, intermediate and later stages in the lateral collision.

For this reason, as illustrated in FIGS. 5A and 5B, the impact absorber 100 illustrated in FIGS. 1 to 4 is provided between the door panel (an inner door panel 202 and an outer door panel 203) and the door trim 201 so as to correspond to a position in which the waist portion L of the passenger P hits the door trim 201 in the lateral collision. As illustrated in FIG. 6A, a first portion 41 corresponding to the pubis 112 of the passenger P is configured in such a manner that stress generated in the first portion 41 in an impact on the passenger P on the door trim 201 has a first predetermined value (for example, 2.5 kN per 100 cm$^2$) or less. A second portion 42 corresponding to the ilium 113 of the passenger P is constituted in such a manner that stress generated in the second portion 42 in the impact on the passenger P on the door trim 201 has a second predetermined value (for example, 7.0 kN per 100 cm$^2$) or more.

More specifically, the first portion 41 has a lower rib density. When the impact absorber 100 receives an impact such that the passenger P hits the door trim 201, consequently, the stress generated in the first portion 41 has the first predetermined value (for example, 2.5 kN per 100 cm$^2$) or less. Moreover, the second portion 42 has a high rib density. When the passenger P hits the door trim 201, consequently, the stress generated in the second portion 42 has the second predetermined value (for example, 7.0 kN per 100 cm$^2$) or more. In the case where the passenger P hits the door trim 201, thus, the load to be applied to the front part (the pubis 112 side) of the pelvis 111 is smaller than the load to be applied to the rear part (the ilium 113 side). As a result, the load to be applied to the pubis 112 may be reduced. FIGS. 6A and 6B depict a sensor 300 provided on the pubis 112 portion and a seating position 301 for the passenger P.

Figure 7:
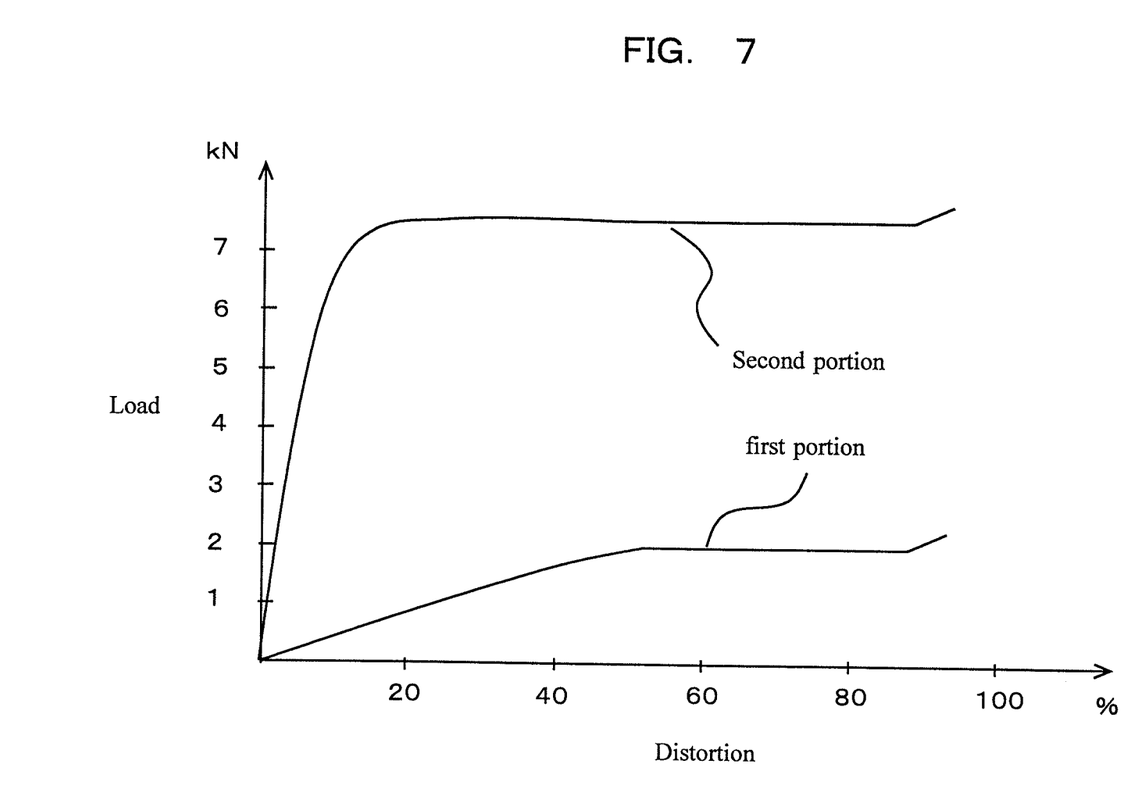
FIG. 7 is a graph illustrating a relationship between a compressive load and a distortion (a displacement) in a first portion and a second portion that constitute the impact absorber according to the embodiment.

Moreover, the first portion 41 corresponding to the pubis 112 in the impact absorber 100 has a lower rib density and a smaller wall thickness. On the other hand, the second portion 42 corresponding to the ilium 113 has a higher rib density and a greater wall thickness. As illustrated in FIG. 7, therefore, in the case where an impact is received, the stress (load) on the second portion 42 indicates an initial maximum stress (a load of 7.5 kN per 100 cm$^2$) when distortion (displacement) generated in the second portion 42 approximates to 20 to 40%. On the other hand, in the case where an impact is received, the stress (load) on the first portion 41 is gently increased until distortion (displacement) generated in the first portion 41 approximates to 30 to 50%, and then indicates an initial maximum stress (a load of 2.0 kN per 100 cm$^2$). For this reason, in the impact absorber 100, the stress generated in the second portion 42 is increased in the initial stage in the lateral collision. Consequently, the second portion 42 can sufficiently absorb the impact, while pushing out part of the waist portion L, which corresponds to the ilium 113 and faces to the second portion 42, toward a car interior side. At the initial stage in the lateral collision, moreover, the stress generated in the first portion 41 is reduced. Therefore, the load to be applied to the pubis 112 may be reduced. In the intermediate and later stages in the lateral collision, the stresses generated by the first portion 41 and the second portion 42 are increased sufficiently. Accordingly, the first portion 41 and the second portion 42 can sufficiently absorb the shock with the loads. FIG. 7 is a graph illustrating a result of a collision test for the impact absorber 100. In this test, an impactor having a load area of 70 mm by 70 mm is caused to collide with the first portion 41. On the other hand, an impactor having a load area of 200 mm by 140 mm is caused to collide with the second portion 42. In the graph illustrated in FIG. 7, the load received from each impactor is indicated with a conversion per 100 cm$^2$.

In the impact absorber 100, moreover, the first portions 41 and 51 having the greater total thickness "a" are not provided with the first recessed ribs 6 and 7. The first recessed ribs 6 and 7 are formed in only the second portions 42 and 52 having the small total thickness "b". Furthermore, the second portion 52 that has a greater thickness and is hard to be recessed can absorb an impact with sufficient stress. In addition, part of the waist portion L, which corresponds to the ilium 113 and faces to the second portion 42, can be pushed out toward the car interior side. Moreover, the stress generated in the first portion 41 that has a small wall thickness and is easily recessed is reduced. For this reason, it is possible to reduce a load to be applied to the pubis 112. At the intermediate and later stages after the stress against the shock that is generated in the second portion 52 reaches a maximum value, the rigidity of the impact absorber 100 (the first portion 51 and the second portion 52) is increased. Therefore, a great shock absorbing effect is exhibited. Accordingly, the first portion 51 and the second portion 52 can absorb an impact with a sufficient stress.

In the impact absorber 100, moreover, the second recessed ribs 9 and 10 are formed in the third portions 43 and 53 constituting a portion between the first portions 41 and 51 and the second portions 42 and 52. Therefore, local deformation of the impact absorber 100 may be prevented. In other words, the third portions 43 and 53 can effectively suppress fluctuation in the loads to be applied to the first portions 41 and 51 and the second portions 42 and 52 in the lateral collision. For this reason, the shock absorbing effect of the impact absorber 100 can be exhibited in an effective manner.

Figure 6A:
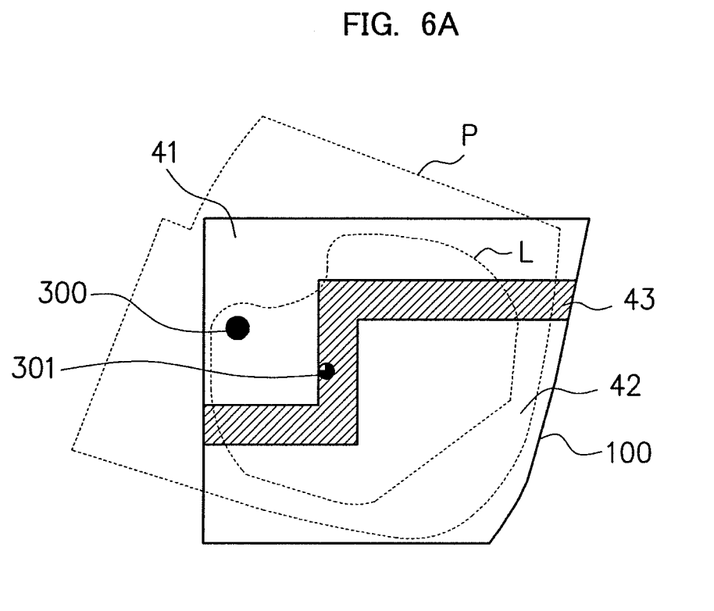
FIGS. 6A and 6B are views illustrating an example of a structure on a first wall side of the impact absorber according to the embodiment.
Figure 6B:
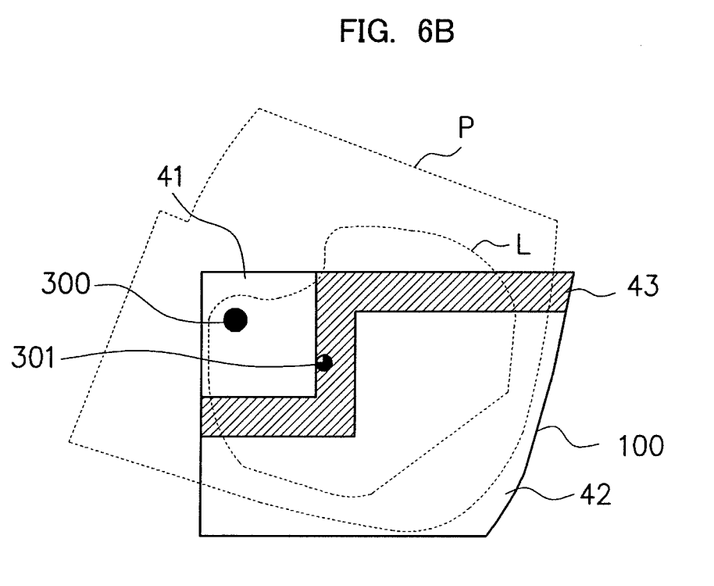

In the present embodiment, it is assumed that the impact absorber 100 illustrated in FIGS. 1 to 4 constitutes the portions 41, 42 and 43 illustrated in FIG. 6A. However, if the impact absorber 100 has such a structure as to include:

the first portion 41 corresponding to the pubis 112 of the passenger P in which the stress generated in the impact of the passenger P on the door trim 201 is equal to or smaller than the first predetermined value (for example, 2.5 kN per 100 cm$^2$);

the second portion 42 corresponding to the ilium 113 of the passenger P in which the stress generated in the impact of the passenger P on the door trim 201 is equal to or greater than the second predetermined value (for example, 7.0 kN per 100 cm$^2$); and the third portion 43 for dividing a portion between the first portion 41 and the second portion 42, it is not restricted to the structure illustrated in FIG. 6A. For example, the impact absorber 100 can also have the structure illustrated in FIG. 6B. In other words, the shape of the third portion 43 constituting the portion between the first portion 41 and the second portion 42 is not particularly restricted. The third portion 43 can have any shape that can divide the first portion 41 from the second portion 42. However, the third portion 43 is constituted to have a stress value (2.5 kN to 7.0 kN per 100 cm$^2$) within a range from the value of the stress in the first portion 41 and the value of the stress in the second portion 42.

<Function and Effect of Impact Absorber 100>

Thus, the stress generated in the impact of the passenger P on the door trim 201 has a first predetermined value (for example, 2.5 kN per 100 cm$^2$) or less in the first portion 41 corresponding to the pubis of a passenger in the impact absorber 100. On the other hand, the stress generated in the second portion 42 corresponding to the ilium of the passenger has the second predetermined value (for example, 7.0 kN per 100 cm$^2$) or more. In the case where the passenger P hits the door trim 201, consequently, a load to be applied to the anterior part (the pubis 112 side) of the pelvis 111 is smaller than a load to be applied to a posterior part (the ilium 113 side). As a result, the load to be applied to the pubis 112 can be reduced, and furthermore, a sufficient impact-absorbing performance can be exhibited.

Moreover, "the case in which the passenger P hits the door trim 201) according to the present embodiment also implies "the case in which the impact absorber receives an impact from the passenger P".

The embodiment is suitable for the impact absorber according to the present disclosure. The impact absorber is not restricted to the embodiment. The impact absorber can be implemented with various changes to the described configurations.

For example, in the impact absorber 100, the first recessed ribs 6 and 7 and the second recessed ribs 9 and 10 are welded in a central portion, such that the bonding portions 8 and 11 are formed. However, the first recessed ribs 6 and 7 and the second recessed ribs 9 and 10 do not have to be welded in the central portion. These can also be welded to the wall surface of the first wall 4 or the second wall 5, for example.

In the embodiment, moreover, the impact absorber 100 provided in the door trim 201 is described as an example. However, the technical idea which is disclosed can also be applied to an impact absorber to be provided in a trim for a vehicle, for example, a body side trim and a floor trim.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An impact absorber provided in a trim of a vehicle for protecting a waist portion of a passenger, comprising:
    a first portion corresponding to a pubis of the passenger; and
    a second portion corresponding to an ilium of the passenger, wherein
    stress generated in the first portion when the passenger hits the trim has a first predetermined value or less,
    stress generated in the second portion when the passenger hits the trim has a second predetermined value or more, the second predetermined value being greater than the first predetermined value, and
    a total thickness of the first portion is greater than a total thickness of the second portion.

2. The impact absorber according to claim 1, further comprising:
    a third portion provided between the first portion and the second portion, wherein
    a value of stress generated in the third portion when the passenger hits the trim ranges from the first predetermined value to the second predetermined value.

3. The impact absorber according to claim 1, further comprising:
    a body having a hollow portion, wherein the body includes:
        a first wall configured to face a passenger side,
        a second wall provided opposite the first wall,
        a recessed rib that is dented inwardly from the first wall and the second wall, and
        a bonding portion to be an abutting portion of a tip of the recessed rib of the first wall and a tip of the recessed rib of the second wall,
    the first wall has at least the first portion and the second portion, and
    an arrangement density of the recessed rib per unit area in the second portion is higher than an arrangement density of the recessed rib per unit area in the first portion.

4. The impact absorber according to claim 1, wherein a wall thickness of the second portion is greater than a wall thickness of the first portion.

5. The impact absorber according to claim 3, wherein the recessed rib is disposed in the second portion.

6. The impact absorber according to claim 3, further comprising:
    a third portion provided between the first portion and the second portion, wherein
    a value of stress generated in the third portion when the passenger hits the trim is a value ranging from the first predetermined value to the second predetermined value, and
    the recessed rib includes:
        a first recessed rib, and
        a second recessed rib having an open region that is larger than an open region of the first recessed rib,
    the first recessed rib being disposed in the second portion,
    the second recessed rib being disposed in the third portion.

7. The impact absorber according to claim 6, further comprising:
    a coupling rib for coupling the first recessed ribs with each other and the first recessed rib with the second recessed rib.

8. The impact absorber according to claim 1, wherein a first recessed rib that is dented inwardly from a wall surface of the impact absorber is provided in the second portion.

9. The impact absorber according to claim 2, wherein the second portion is provided with a first recessed rib that is dented inwardly from a wall surface of the impact absorber, and
    the third portion is provided with a second recessed rib that is dented inwardly from the wall surface and having an open region larger than an open region of the first recessed rib.

10. The impact absorber according to claim 1, wherein the first predetermined value is 2.5 kN per 100 cm², and the second predetermined value is 7.0 kN per 100 cm².

11. The impact absorber according to claim 1, wherein the trim is any one of a door trim, a body side trim and a floor trim in the vehicle.

12. A door for a vehicle comprising:
a door panel;
a door trim; and
the impact absorber according to claim 1, wherein the impact absorber is disposed between the door panel and the door trim.

13. A vehicle comprising the door for a vehicle according to claim 12.

14. An impact absorber provided in a trim of a vehicle for protecting a waist portion of a passenger, comprising:
a first portion corresponding to a pubis of the passenger;
a second portion corresponding to an ilium of the passenger, and
a body having a hollow portion, wherein the body includes:
a first wall configured to face a passenger side and includes the first portion and the second portion,
a second wall provided opposite the first wall, and
a recessed rib dented inwardly from the first wall and the second wall and disposed in the second portion, wherein
the first wall has at least the first portion and the second portion,
stress generated in the first portion when the passenger hits the trim has a first predetermined value or less, and
stress generated in the second portion when the passenger hits the trim has a second predetermined value or more, the second predetermined value being greater than the first predetermined value.

15. The impact absorber according to claim 14, further comprising:
a third portion between the first portion and the second portion, wherein
a recessed rib is dented inwardly from the first wall and the second wall and provided in the third portion.

* * * * *